US012624671B1

(12) United States Patent
Geisick et al.

(10) Patent No.: US 12,624,671 B1
(45) Date of Patent: May 12, 2026

(54) PISTON AND INJECTOR FOR REDUCED HEAD THERMAL LOADING

(71) Applicant: Deere & Company, Moline, IL (US)

(72) Inventors: Bryan T. Geisick, Cedar Falls, IA (US); Won Geun Lee, Cedar Falls, IA (US)

(73) Assignee: DEERE & COMPANY, Moline, IL (US)

(*) Notice: Subject to any disclaimer, the term of this patent is extended or adjusted under 35 U.S.C. 154(b) by 0 days.

(21) Appl. No.: 18/947,759

(22) Filed: Nov. 14, 2024

(51) Int. Cl.
*F02F 3/00* (2006.01)
*F02F 3/24* (2006.01)
*F02F 3/28* (2006.01)

(52) U.S. Cl.
CPC . *F02F 3/28* (2013.01); *F02F 3/24* (2013.01)

(58) Field of Classification Search
CPC . F02F 3/26; F02F 3/28; F02B 23/0651; F02B 23/0627; F02B 23/0696; F02B 2075/125; F02B 2275/14; F02B 23/0678; F02B 23/0672; F02B 23/04
USPC ........................................................ 123/193.6
See application file for complete search history.

(56) References Cited

U.S. PATENT DOCUMENTS

| | | | | |
|---|---|---|---|---|
| 4,958,604 | A * | 9/1990 | Hashimoto | F02F 3/26 123/305 |
| 5,109,816 | A * | 5/1992 | Sasaki | F02B 23/104 123/263 |
| 5,127,379 | A * | 7/1992 | Kobayashi | F02B 25/145 123/193.5 |
| 6,286,477 | B1 * | 9/2001 | Yang | F02B 23/104 123/305 |
| 8,646,428 | B2 | 2/2014 | Eismark et al. | |
| 10,024,267 | B2 * | 7/2018 | Nishida | F02B 23/069 |
| 11,840,984 | B2 | 12/2023 | Eismark et al. | |
| 2002/0170531 | A1 * | 11/2002 | Saito | F02B 17/005 123/301 |

FOREIGN PATENT DOCUMENTS

| | | |
|---|---|---|
| FR | 2880923 A1 | 7/2006 |

* cited by examiner

*Primary Examiner* — Hung Q Nguyen
*Assistant Examiner* — James J Kim
(74) *Attorney, Agent, or Firm* — KLINTWORTH & ROZENBLAT LLP

(57) ABSTRACT

A piston and injector system designed to minimize thermal loading on the cylinder head of an internal combustion engine. The piston features a profiled upper surface that defines an annular piston bowl with a primary bowl configuration and an asymmetric bowl sector. The asymmetric bowl sector is configured to receive the fuel spray from the injector, directing combustion to reduce heat concentration on certain areas of the cylinder head. This design helps prevent overheating, thereby enhancing engine durability and performance.

20 Claims, 8 Drawing Sheets

PISTON AND INJECTOR FOR REDUCED HEAD THERMAL LOADING

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to piston technology for internal combustion engines, and more particularly, but not by way of limitation, to piston heads with bowl configurations designed to optimize fuel combustion and engine performance.

BACKGROUND OF THE DISCLOSURE

Combustion systems in vehicles must balance numerous physical constraints, particularly the thermal and pressure limits of engine materials. Managing surface temperatures in the cylinder head is critical to prevent plastic deformation and cracking, which can result in engine failure. High-performance engines are especially susceptible to these issues, as they generate significant heat during operation. Conventional cooling techniques, such as optimizing coolant passages, combustion chamber configurations, and piston designs, have achieved modest reductions in cylinder head temperatures without compromising engine performance. These methods struggle to maintain low temperatures in areas near the exhaust bridge, where thermal stress is most severe.

SUMMARY OF THE DISCLOSURE

A piston and injector for reduced head thermal loading are disclosed. According to some embodiments, the present disclosure is directed to a piston for an engine having a cylinder head with a cylinder defining a combustion chamber and supporting a fuel injector configured to deliver a spray of fuel to the combustion chamber. The piston also includes a piston head having a profiled upper surface that extends radially about a centerline and defines an annular piston bowl, the annular piston bowl has a primary bowl with a first bowl configuration and an asymmetric bowl sector with a second bowl configuration different from the first bowl configuration, the primary bowl extends about the centerline proximate a periphery of the piston head to each side of the asymmetric bowl sector, the primary bowl defined by a sweep of a radial line from the centerline of the piston head through a first angle and the asymmetric bowl sector defined by a sweep of the radial line from the centerline of the piston head through a second angle less than the first angle, the second angle sized so that the spray of fuel from the fuel injector is received within the asymmetric bowl sector and not the primary bowl.

Implementations may include one or more of the following features. The piston where the asymmetric bowl sector is located beneath a section of the cylinder head defining an exhaust bridge extending between a first exhaust valve port and a second exhaust valve port.

The asymmetric bowl sector effects a combustion of the spray of fuel such that a temperature at the exhaust bridge is a reduced temperature that is less than a first temperature corresponding to a combustion of the spray of fuel effected by the asymmetric bowl if configured with the first bowl configuration. The first angle of the primary bowl is greater than 180 degrees.

The second angle of the asymmetric bowl sector is less than 90 degrees. The upper surface of the piston head defines an annular shelf extending about the centerline between the annular bowl and the periphery of the piston head, the annular shelf including a primary shelf extending along the primary bowl and having a first shelf configuration and an asymmetric shelf sector extending along the asymmetric bowl sector having a second shelf configuration different from the first shelf configuration. The first shelf configuration of the primary shelf extends farther below a top plane of the piston head than the second shelf configuration of the asymmetric shelf sector.

The second bowl configuration of the asymmetric bowl sector has a greater concavity and extends farther from the centerline beneath the annular shelf than the first bowl configuration of the primary bowl; and where a combustion of the spray of fuel is contained within the asymmetric bowl sector below the asymmetric shelf. The second bowl configuration of the asymmetric bowl sector has a greater concavity and extends farther from the centerline and a top plane of the piston head than the first bowl configuration of the primary bowl. The first bowl configuration is of a first uniform cross-section throughout the first angle; and where the second bowl configuration is of a second uniform cross-section throughout the second angle different from the first uniform cross-section.

According to some embodiments, the present disclosure is directed to an engine having a cylinder head with a cylinder defining a combustion chamber and supporting a fuel injector configured to deliver of a spray of fuel to the combustion chamber. The engine where the asymmetric bowl sector of the piston head is located beneath a section of the cylinder head defining an exhaust bridge extending between a first exhaust valve port and a second exhaust valve port. The asymmetric bowl sector of the piston head effects a combustion of the spray of fuel such that a temperature at the exhaust bridge is a reduced temperature that is less than a first temperature corresponding to a combustion of the spray of fuel effected by the asymmetric bowl if configured with the first bowl configuration.

The first angle of the primary bowl is greater than 180 degrees. The second angle of the asymmetric bowl sector is less than 90 degrees. The upper surface of the piston head defines an annular shelf extending about the centerline between the annular bowl and the periphery of the piston head, the annular shelf including a primary shelf extending along the primary bowl and having a first shelf configuration and an asymmetric shelf sector extending along the asymmetric bowl sector having a second shelf configuration different from the first shelf configuration.

The first shelf configuration of the primary shelf extends farther below a top plane of the piston head than the second shelf configuration of the asymmetric shelf sector. The second bowl configuration of the asymmetric bowl sector has a greater concavity and extends farther from the centerline beneath the annular shelf than the first bowl configuration of the primary bowl; and where a combustion of the spray of fuel is contained within the asymmetric bowl sector below the asymmetric shelf.

The second bowl configuration of the asymmetric bowl sector has a greater concavity and extends farther from the centerline and a top plane of the piston head than the first bowl configuration of the primary bowl. The first bowl configuration is of a first uniform cross-section throughout the first angle; and where the second bowl configuration is of a second uniform cross-section throughout the second angle different from the first uniform cross-section.

The details of one or more embodiments are set forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures.

Figure 1:
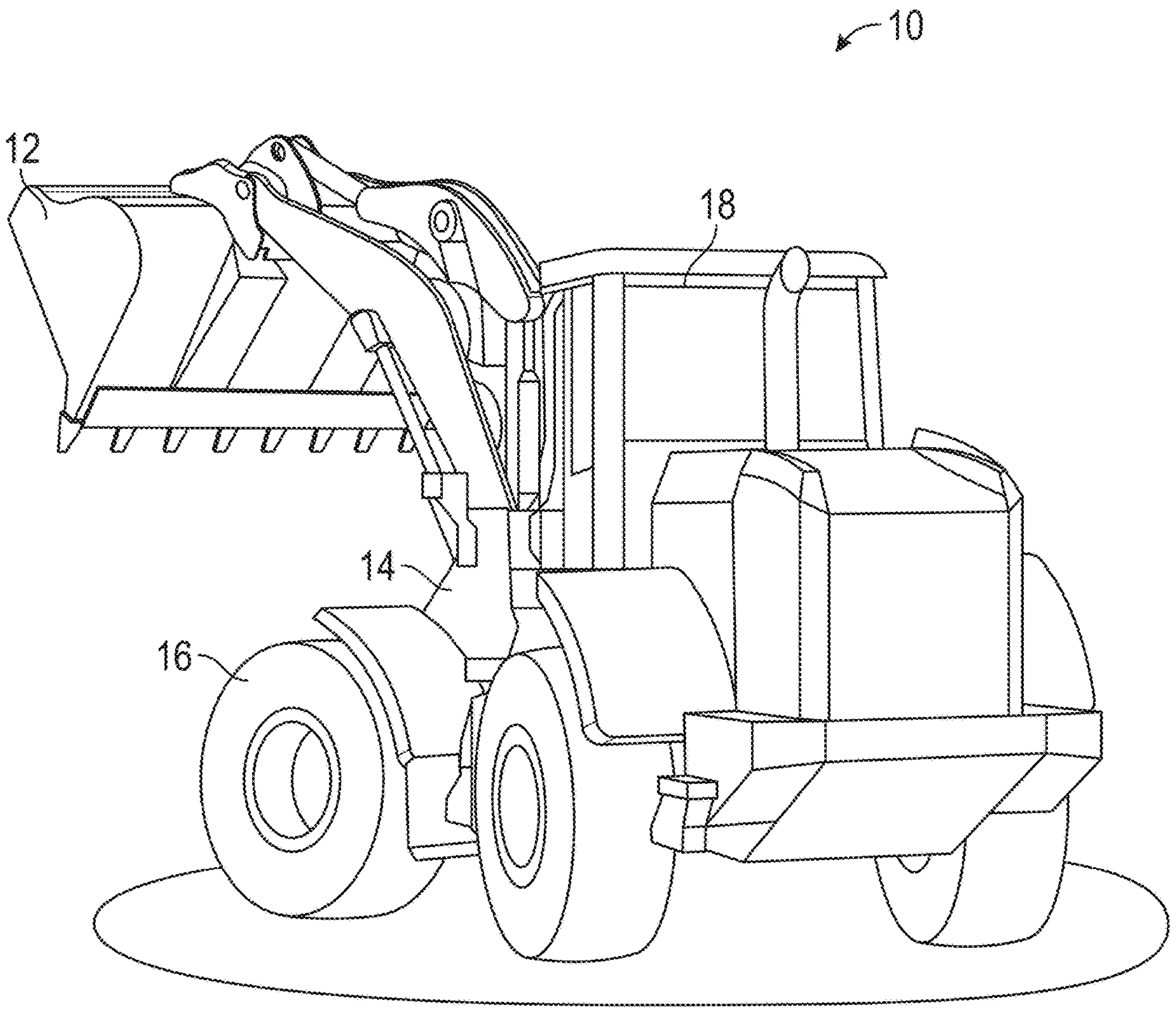
FIG. 1 is a simplified perspective view of an example work vehicle in the form of a wheel loader in which an engine having the disclosed piston and injector may be incorporated.

Like reference symbols in the various drawings indicate like elements. For simplicity and clarity of illustration, descriptions, and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set forth in the appended claims.

OVERVIEW

Traditional thermal management approaches often involve trade-offs that negatively impact engine efficiency and durability. For instance, increasing the size of cooling passages may improve cooling but can also reduce the structural strength of the cylinder head, thereby limiting the performance capability of the combustion system and the engine. Additionally, larger cooling passages can lead to higher material costs, constraints on port geometry, and increased coolant heat rejection. Therefore, there is a need for piston designs that can effectively reduce thermal loading on the engine head while maintaining or improving overall engine performance.

Modern engines face significant challenges in managing the heat generated during operation. It is desirable for the surface temperature of the cylinder head to remain low enough to prevent deformation and crack formation. However, reducing these temperatures while maintaining engine performance can be difficult. Traditional cooling methods, such as enlarging coolant passages, may reduce structural integrity, limit performance, and increase costs. Existing designs often struggle to provide sufficient cooling, particularly in high-temperature regions like the exhaust bridge, where localized overheating commonly leads to thermal stress and material degradation.

The present disclosure introduces piston designs that address the challenge of managing heat in critical areas of the cylinder head, particularly around the exhaust bridge. These designs incorporate an asymmetric piston bowl configuration that directs combustion gases away from vulnerable regions of the cylinder head, including the exhaust valves and injectors. By shaping the piston to include distinct asymmetric sectors and aligning fuel injection patterns accordingly, the design reduces localized surface temperatures in thermally stressed areas, such as between the exhaust valves. This configuration mitigates excessive heat buildup, reducing the likelihood of cracks or deformation in the cylinder head. The asymmetric piston design balances heat loads across the combustion chamber, effectively managing thermal stress without compromising overall engine performance.

In addition to thermal management, the disclosed piston design offers potential advantages such as supporting larger valve configurations due to the reduced need for extensive cooling passages. By optimizing heat distribution within the combustion chamber, the design helps minimize thermal distortion in the valve seats, improving sealing efficiency and enhancing durability. Furthermore, the lower thermal stress on the cylinder head allows for the use of less expensive or lighter materials without compromising performance, providing manufacturers with greater design flexibility. The reduced heat transfer to vulnerable areas also mitigates valve seat distortion and rotation issues, contributing to improved long-term reliability and extended component life.

The asymmetric piston bowl geometry is also designed to improve combustion control within the chamber, particularly under challenging operating conditions such as cold starts. By directing the fuel spray and managing combustion reactions within specific areas of the chamber, the design helps manage localized heat distribution, which can be especially beneficial during cold starts when lower in-cylinder temperatures typically reduce fuel vaporization and combustion completeness. By improving the atomization and targeted distribution of the fuel spray, the design supports more consistent ignition and can potentially enhance cold start performance. This allows for faster and more complete combustion during engine startup, even when full operating temperatures have not yet been reached, further contributing to reduced thermal stress on critical engine components.

The disclosed engine design also integrates the combined use of asymmetric bowl sectors and asymmetric fuel spray patterns to enhance thermal management and combustion efficiency. By coordinating these asymmetric bowl sectors with precisely angled fuel sprays from the injector, the system ensures that fuel is directed into specific regions of the asymmetric and/or symmetric sectors. This targeted fuel delivery optimizes the combustion process, minimizing localized heat buildup in certain areas while promoting more uniform heat distribution across the cylinder head. The combined effect of these asymmetric features helps reduce thermal stress, extending the durability of engine components without compromising performance.

The following description offers further explanation of the embodiments and should be interpreted as a contextual example to facilitate the understanding of this disclosure.

EXAMPLE EMBODIMENTS

Referring to FIG. 1, an example work vehicle 10 in the form of a self-propelled vehicle (e.g., a wheel loader) houses or otherwise supports a bucket 12 attached to an articulating arm. The work vehicle 10 may incorporate an engine with the disclosed piston and injector. The work vehicle 10 may be either manned or autonomous and is primarily used to scoop or distribute material with the bucket 12. The work vehicle 10 includes a chassis 14 supported by ground-engaging members 16 (e.g., wheels or tracks) and supports a cab 18.

Figure 2:
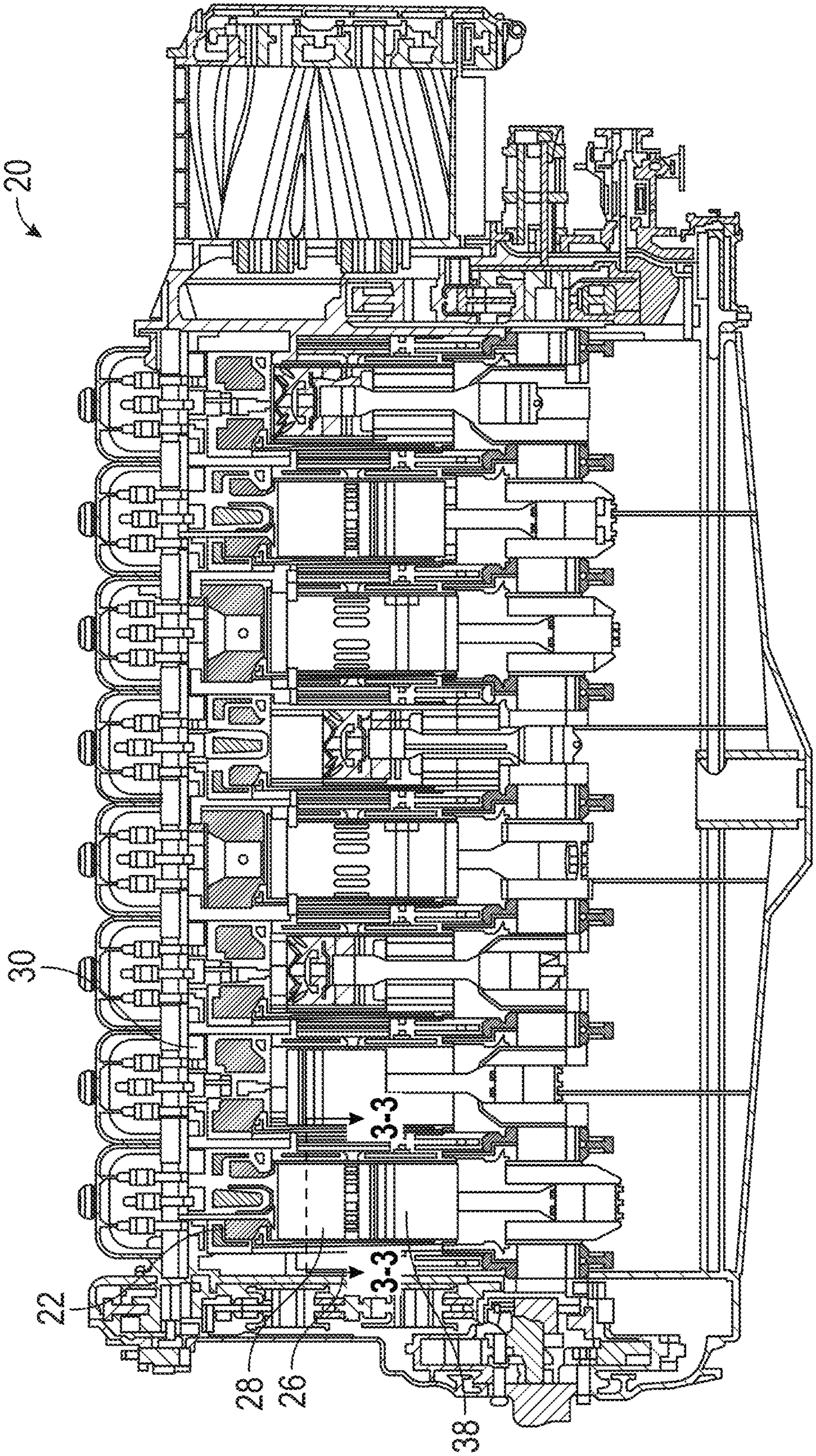
FIG. 2 is a side view of an engine thereof having a cylinder head, engine block, pistons, and combustion chambers.

FIG. 2 illustrates a side view of an engine 20 (such as a diesel engine) and the relationship between a cylinder head 22, a head gasket 24 (see FIG. 3), and an engine block 26. The cylinder head 22, positioned at the top, contains the combustion chambers and is used to manage heat generated during diesel combustion. The head gasket 24, situated between the cylinder head 22 and engine block 26, provides a seal to prevent the leakage of coolant, oil, and combustion gases, ensuring the integrity of the combustion chamber under high pressure and temperature conditions. The engine block 26 houses a plurality of cylinders and pistons and serves as the structural foundation of the engine 20. The pistons couple with a crankshaft via connecting rods. The cylinder head 22 has a plurality of cylinders, such as cylinder 28. The cylinder 28 and piston 38 define a combustion chamber 30 where a mixture of air and fuel is ignited. An example enlarged cross-section of the engine 20 taken about section line 3-3 is illustrated and described below with reference to FIG. 3.

Figure 3:
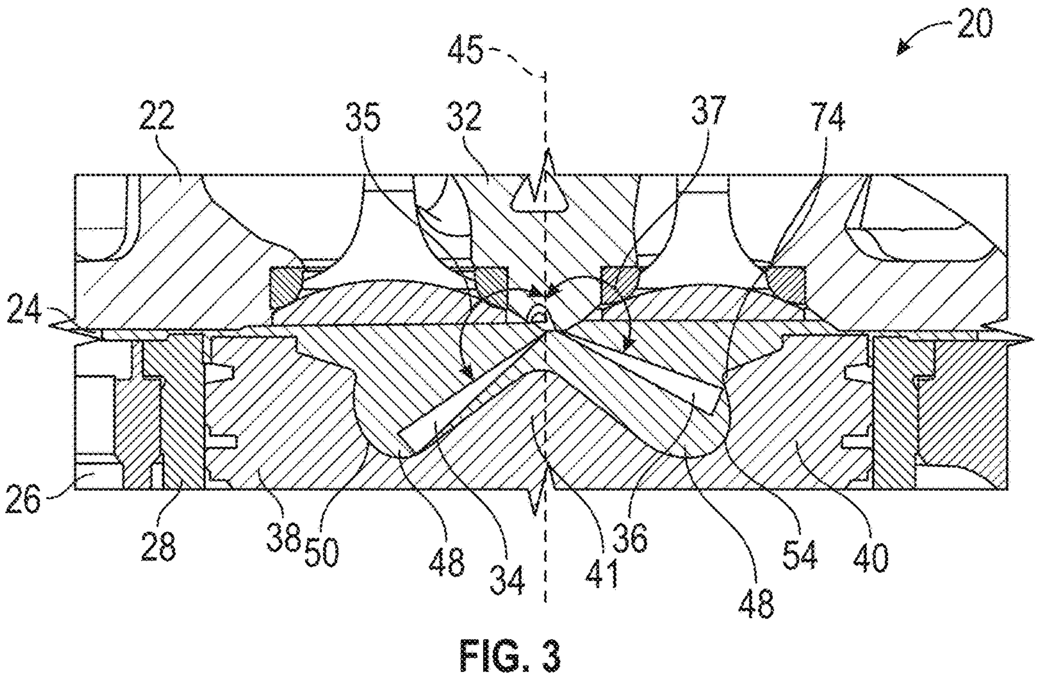
FIG. 3 is an enlarged sectional view of the area 3-3 of FIG. 2, in FIG. 3 the relationship between the cylinder head, head gasket, and engine block, showing their positions in the engine assembly.

FIG. 3 is an enlarged sectional view of the area 2-2. In FIG. 3 the relationship between the cylinder head 22, head gasket 24, and engine block, 26 showing their positions in the engine 20. Referring now to FIGS. 2 and 3 collectively, the fuel injector 32, mounted in the cylinder head 22, is configured to deliver fuel into the combustion chamber 30 through two or more distinct spray patterns. A first fuel spray 34 is directed into the primary bowl 48 in a first spray pattern. The first fuel spray 34 is delivered at a first angle 35 relative to the centerline 45 of the fuel injector 32. When the fuel and air are ignited, the primary bowl's shape directs combustion gases upward toward the exhaust valve ports 64 and 66 in the cylinder head 22.

A second fuel spray 36, delivered at a second angle 37 relative to the injector centerline 45, is directed at the asymmetric bowl sector 52. This sector has a different, asymmetric geometry compared to the primary bowl 48. The unique shape of the asymmetric bowl sector 52 partially restricts the upward flow of combustion gases, preventing them from directly impacting the exhaust valve ports. This design helps reduce the temperature at the exhaust bridge 62 between adjacent exhaust valve ports 64 and 66, which lowers the thermal load on this area of the cylinder head 22. This reduction in temperature helps prevent cracking and deformation, improving the durability of the engine head.

In one example, the fuel injector 32 directs fuel into the combustion chamber at two distinct angles, resulting in asymmetry between the first and second fuel sprays 34 and 36. The first fuel spray 34 is directed into the primary bowl 48 at a first angle 35, while the second fuel spray 36 is directed into the asymmetric bowl sector 52 at a second angle 37. This angular disparity ensures that the fuel sprays interact with different regions of the piston head 40, optimizing the combustion process by targeting specific areas within the combustion chamber, particularly to control heat transfer and combustion dynamics. The annular shelf 74 surrounding the asymmetric bowl sector 52 plays a significant role in controlling the flow of combustion gases. By introducing a physical barrier, the shelf contains and directs the combustion gases, preventing them from freely flowing into critical areas such as the exhaust valve ports. This containment reduces localized heat transfer and thermal stress on the exhaust bridge 62. The shelf's interaction with the fuel spray 36 ensures that the hot combustion gases are confined within the asymmetric bowl, optimizing heat dissipation away from vulnerable areas of the cylinder head.

The disclosed engine design employs a combination of asymmetric bowl sectors and fuel spray patterns with differing angles to target reducing thermal stress at the exhaust bridge 62. The asymmetric bowl sector 52 is positioned beneath the exhaust bridge 62, an area susceptible to excessive heat. The fuel injector 32 directs two distinct fuel sprays: the first fuel spray 34 is directed into the primary bowl 48, promoting even combustion in certain regions of the combustion chamber 30. Meanwhile, the second fuel spray 36 is aimed at the asymmetric bowl sector 52, where it generates a localized combustion event that limits the upward movement of hot combustion gases. This targeted approach can minimize heat transfer to the exhaust bridge 62, helping to reduce the surface temperature in this vulnerable area. By controlling how heat is distributed within the combustion chamber, particularly near the exhaust valves, the design can effectively mitigate thermal stress without compromising overall engine performance. The combined use of asymmetric fuel spray angles and bowl geometry can facilitate improved heat management, leading to enhanced durability of the cylinder head and exhaust components.

As noted above, the cylinder head 22 also supports intake and exhaust ports. Generally, the intake ports allow air to enter the combustion chamber in a diesel engine. During the intake stroke, the intake valve opens, and air is drawn through the intake port into the cylinder as the piston moves downward. This air is then compressed to a high pressure and temperature, and fuel is injected directly into the compressed air, where it ignites due to the high temperature, producing power.

Exhaust ports 64 and 66 facilitate the expulsion of burnt gases from the combustion chamber after the fuel has combusted. Following combustion, the exhaust gases are forced out of the cylinder through the exhaust port as the piston moves upward during the exhaust stroke. The exhaust valve opens during this stroke, allowing the gases to exit through the exhaust port and into the exhaust manifold, eventually being expelled from the engine 20 through an exhaust system.

To address the challenge of reducing heat transfer into specified areas of the cylinder head 22, a piston design is proposed that optimally balances heat loads across surfaces of the combustion system. The combustion system refers to an overall area in the engine 20 where combustion occurs, including metal surfaces of the cylinder head, piston, and cylinder walls that are directly exposed to the heat generated during combustion. The piston design is intended to distribute and manage the heat load more effectively across these components, preventing excessive heat transfer to critical areas like the cylinder head. The primary bowl 48 features a more uniform, symmetric geometry, designed to promote even combustion across the periphery of the piston head. In contrast, the asymmetric bowl sector 52, with its greater concavity, is specifically tailored to direct combustion gases away from sensitive areas of the cylinder head. The differing sidewall slopes between the two bowl sectors are critical to shaping the combustion plume, which results in improved control over gas expansion and reduced thermal impact on the exhaust valves. The contrasting angles at which the bowl sectors extend—particularly the reduced volume in the asymmetric bowl—contribute to localized thermal management, enhancing the overall durability of the engine.

Figure 4:
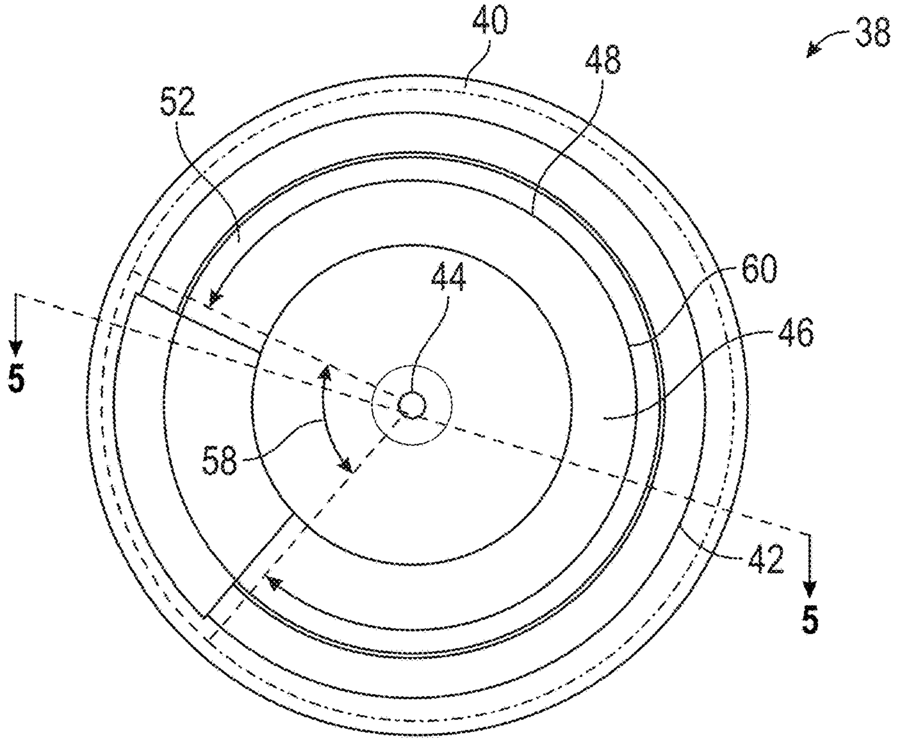
FIG. 4 is a top view of a piston showing the placement of exhaust valve relief pockets.
Figure 5:
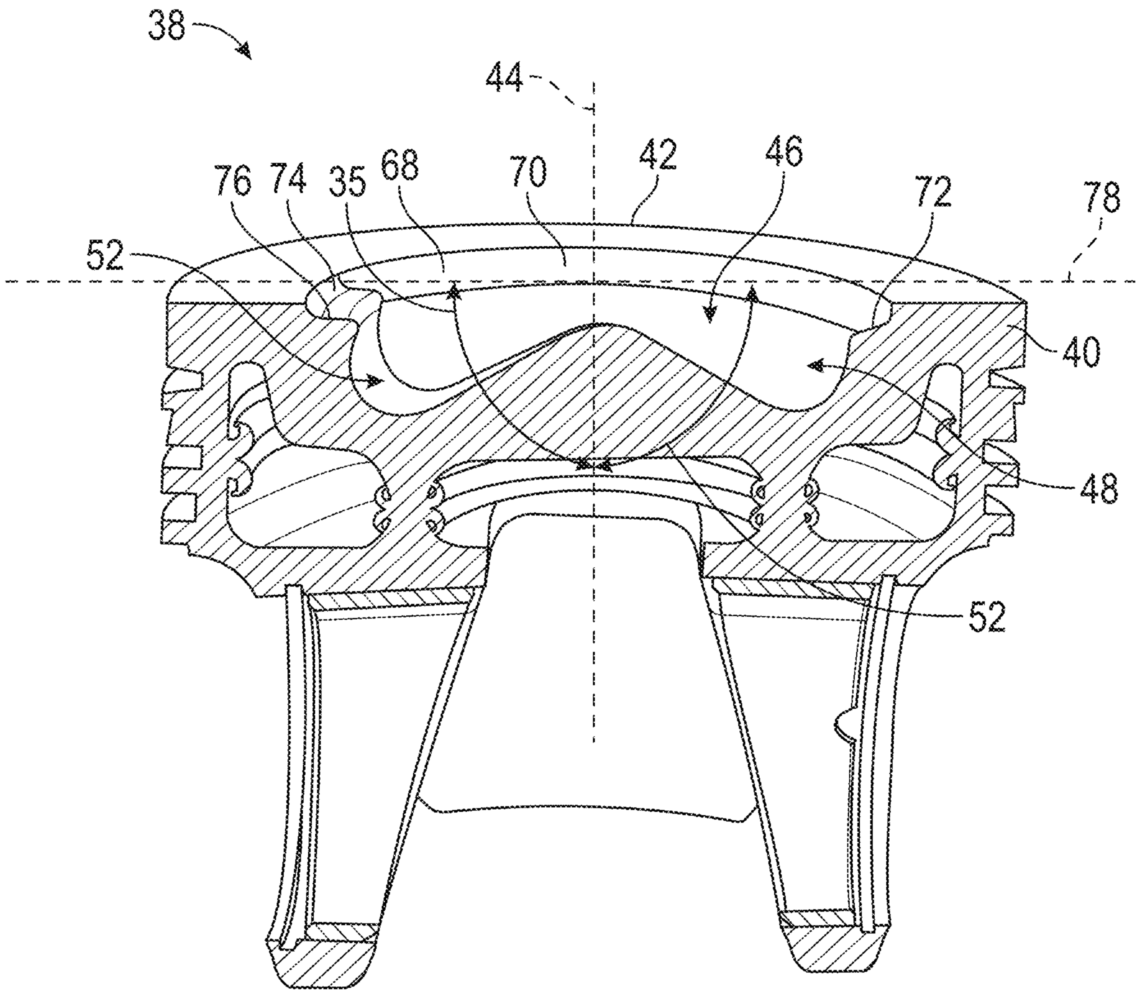
FIG. 5 is a side sectional view thereof taken along plane 5-5 of FIG. 4.

Referring now to FIGS. 4 and 5, a piston 38 features a sector with a distinctive shape that effectively reduces temperatures in vulnerable areas of the cylinder head without causing significant increases in overall piston temperatures. Specifically, FIG. 4 is a top view of a piston showing the placement of exhaust valve relief pockets. FIG. 5 is a side sectional view thereof taken along plane 5-5 of FIG. 4.

The asymmetric design of the piston bowl complements the need for asymmetric relief pockets in the piston, which are necessary to accommodate exhaust valve braking. This design not only enhances thermal management but also aligns with the functional requirements of modern engine systems. The placement of the asymmetric bowl sector 52 beneath the exhaust bridge 62 is particularly advantageous for reducing thermal stress in this critical region. The exhaust bridge, which connects the first exhaust valve port 64 to the second exhaust valve port 66, is highly prone to thermal degradation due to concentrated heat from combustion. By confining the combustion within the asymmetric bowl sector, the design prevents the direct impingement of hot gases on the bridge, significantly lowering the temperature at this junction. This feature enhances the durability of the cylinder head, preventing crack initiation and propagation commonly associated with excessive thermal loads.

It will be understood that exhaust valve braking is a technique used in engines, particularly in diesel engines, where the exhaust valves are utilized to help slow down the engine, acting as an engine brake. This method is commonly used in heavy-duty vehicles, such as trucks, to control speed without relying solely on the friction brakes, which reduces wear on the brake components and provides better control during downhill descents.

Figure 10:
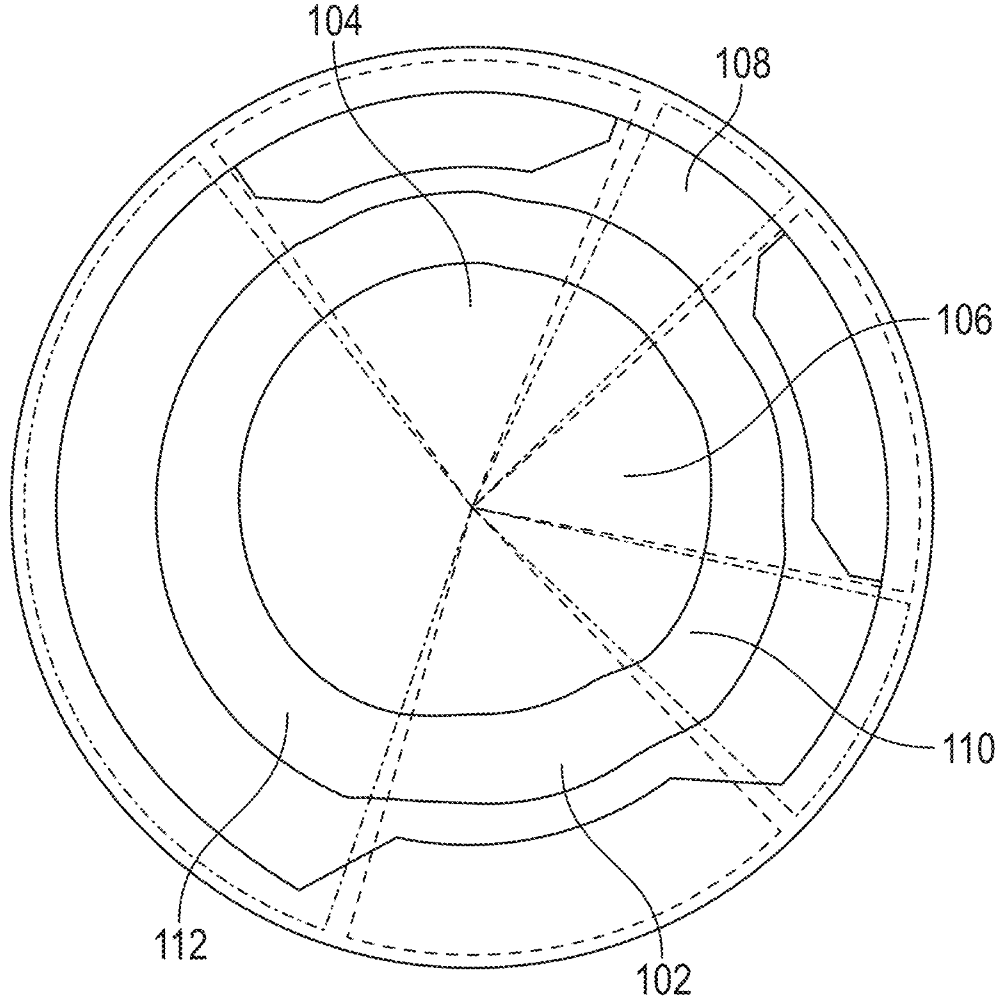
FIG. 10 is a top view of an example alternative piston having multiple asymmetric bowl sectors.

The asymmetric relief pockets in the piston are specially shaped indentations designed to provide clearance for the exhaust valves when they open, especially during exhaust valve braking. The design of these relief pockets aligns with the asymmetric piston bowl to ensure that the exhaust valves can open fully without interference from the piston. This coordination allows the engine to effectively perform exhaust valve braking, thereby enhancing the braking performance while maintaining the integrity of the engine components. In certain configurations, the piston may incorporate multiple asymmetric bowl sectors, each with distinct geometric characteristics tailored to manage combustion in different regions of the piston. As shown in FIG. 10, the depth and concavity of each sector can vary to provide a targeted approach to heat management. This multi-sector design allows for even more precise control over combustion dynamics, directing heat away from sensitive areas while ensuring efficient fuel burn. By distributing the thermal load across various sectors, this approach minimizes localized heating and reduces the overall thermal stress on the cylinder head and other critical components.

In one embodiment, the piston 38 includes a piston head 40 with a profiled upper surface 42 that extends radially around a centerline 44. This upper surface 42 defines an annular piston bowl 46, which is divided into distinct regions.

The annular piston bowl 46 comprises a primary bowl 48 with a first bowl configuration 50 (see FIG. 2) and an asymmetric bowl sector 52 with a second bowl configuration 54 (see FIG. 2), different from the first bowl configuration 50. In general, the primary bowl 48 is considered a symmetric bowl portion. The primary bowl 48 encircles the centerline 44 near the periphery of the piston head 40 and extends on both sides of the asymmetric bowl sector 52. The shape of the primary bowl 48 is defined by the sweep of a radial line from the centerline 44 through a first angle 58. It will be understood that the radial line extends from a center of the piston head 40 to an outer edge of the piston head 40.

The annular piston bowl 46 includes a conical center 41. The lower sidewalls of each of the primary bowl 48 and the asymmetric bowl sector 52 converge to define the conical center 41. In some embodiments, each of the lower sidewalls can have a distinct slope, as illustrated with respect to the piston of FIGS. 7 and 8. This difference in slope adds to the asymmetry between the respective bowl portions.

In some embodiments, the asymmetric bowl sector 52 is defined by a sweep of the radial line through a second angle 60, which is smaller than the first angle 58. The second angle 60 is sized so that the fuel spray 34 from the fuel injector 32 is directed into the asymmetric bowl sector 52, thereby avoiding the primary bowl 48 (see the first and second fuel spray above). In one embodiment, the primary bowl 48 generally extends over an angle greater than 180 degrees, while the asymmetric bowl sector 52 covers an angle of less than 90 degrees. The primary bowl 48 can extend over angles greater than or less than 180 degrees, and the asymmetric bowl sector 52 can cover an angle greater than 45 degrees.

Figure 6:
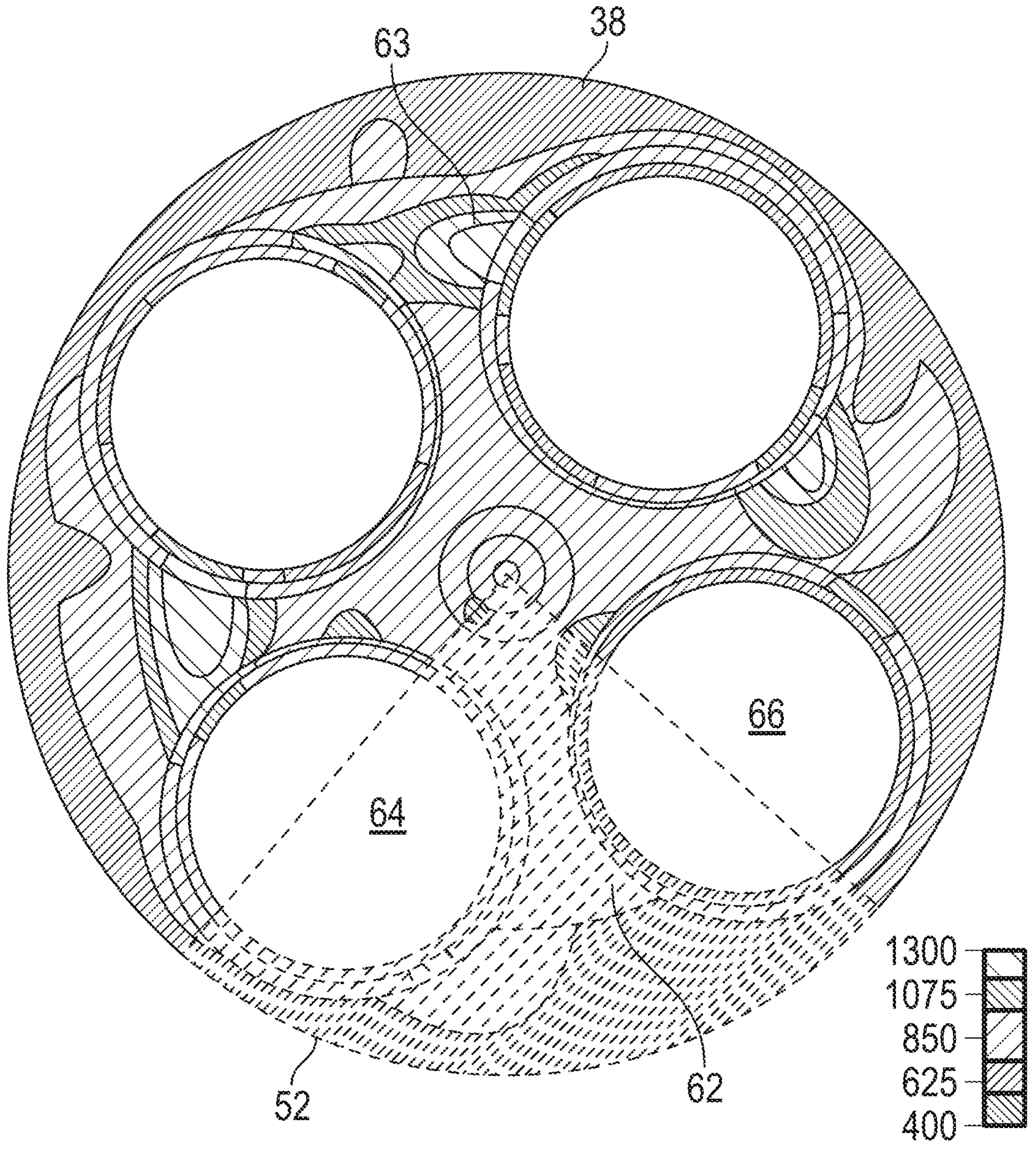
FIG. 6 is a heat signature illustration thereof.

Referring collectively to FIGS. 2-6 collectively, as noted above, the asymmetric bowl sector 52 is positioned directly beneath a portion of the cylinder head 22 that forms an exhaust bridge 62. This exhaust bridge 62 links the first exhaust valve port 64 to the second exhaust valve port 66. The design of the asymmetric bowl sector 52 is intended to influence the combustion of the fuel spray 34 in a way that reduces the temperature at the exhaust bridge 62 to a level lower than what would occur if the combustion took place in the primary bowl 48 configured with the first bowl configuration 50 such as that occurring at the exhaust bridge 63 as illustrated in FIG. 6, a heat signature of the piston.

FIG. 6 highlights areas of heat concentration and lower thermal stress. The exhaust bridge 63 of the piston 38 represents a high-temperature zone, where the heat buildup is more prominent, indicating thermal stress.

The exhaust bridge 62 and the associated ports, 64 and 66 show thermal variations that reflect the asymmetric piston sector's role in reducing heat transfer to certain parts of the cylinder head. The asymmetry of the piston bowl creates distinct temperature gradients, helps manage heat dissipation more effectively, and reduces the risk of overheating at vulnerable spots like the exhaust bridge 62.

Additionally, the upper surface 42 of the piston head 40 includes an annular shelf 68 that encircles the centerline 44 between the annular piston bowl 46 and the outer edge of the piston head 40. This annular shelf 68 includes of a primary shelf 70 along the primary bowl 48, with a first shelf configuration 72, and an asymmetric shelf sector 74 along the asymmetric bowl sector 52, with a second shelf configuration 76 different from the first shelf configuration 72.

The first shelf configuration 72 of the primary shelf 70 extends farther below the top plane 78 of the piston head 40 than the second shelf configuration 76 of the asymmetric shelf sector 74. The second bowl configuration 54 of the asymmetric bowl sector 52 has a greater concavity and extends farther from the centerline 44 beneath the annular shelf 68 than the first bowl configuration 50 of the primary bowl 48. This design ensures that the combustion of the fuel spray 34 remains mostly confined within the asymmetric bowl sector 52, beneath the asymmetric shelf sector 74. The second bowl configuration 54 of the asymmetric bowl sector 52 also extends farther from the centerline 44 and the top plane 78 of the piston head 40 than the first bowl configuration 50 of the primary bowl 48.

The first bowl configuration 50 maintains a uniform cross-section throughout the first angle 58, while the second bowl configuration 54 maintains a different uniform cross-section throughout the second angle 60. This detailed structure and arrangement of the piston 38 enhance the combustion process, leading to improved engine performance and reduced thermal stress on key engine components.

Figure 7A:
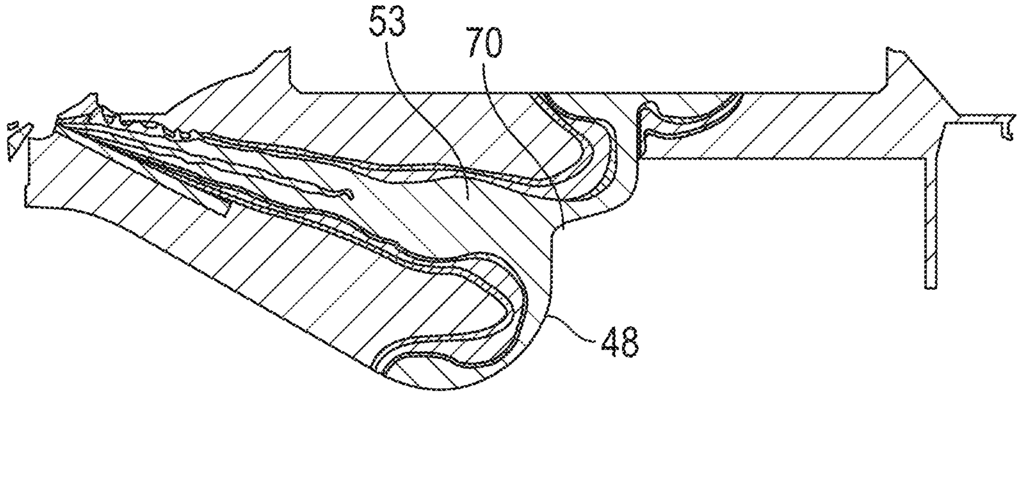
FIG. 7A is a heat signature illustration of the combustion of a primary bowl.
Figure 7B:
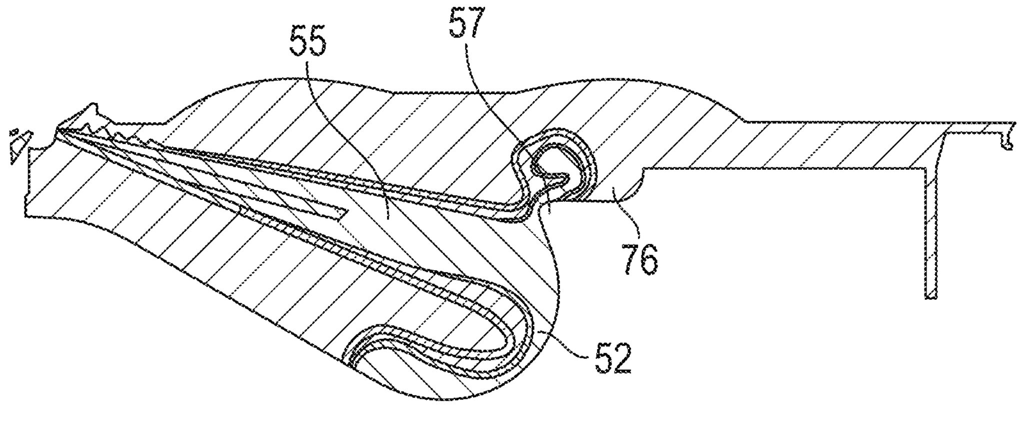
FIG. 7B is a heat signature illustration of the combustion of an asymmetric bowl sector of the piston of FIGS. 4 and 5.

The thermal distribution diagrams in FIGS. 7A and 7B collectively illustrate the temperature profiles of the primary bowl 48 and the asymmetric bowl sector 52 during combustion, which illustrate distinct thermal management characteristics of each design.

In FIG. 7A, is a side view of a primary bowl 48, the thermal profile 53 exhibits high-temperature regions concentrated in the lower portion of the primary bowl 48. These regions project upwardly, indicating efficient fuel atomization and air-fuel mixing promoted by the primary bowl 48 geometry. The upward projection of the thermal plume demonstrates vertical penetration of the fuel spray, maximizing utilization of the full air charge. The primary shelf 70, devoid of a specific shelf or contour, allows for unimpeded combustion gas expansion. This configuration facilitates rapid flame propagation and enables higher peak cylinder pressures, enhancing power output and thermal efficiency. However, the direct path for hot gases toward the exhaust valves and exhaust bridge results in increased heat flux to these regions, which can accelerate valve seat recession and thermal fatigue of the cylinder head material.

Conversely, in FIG. 7B, the asymmetric bowl sector 52 presents a thermal profile 55 that is distinct from the thermal profile 53. This modification is attributed to a contour 57 of the second shelf configuration 76. The geometric feature introduces a strategically placed flow obstruction that alters the combustion gas dynamics. Consequently, the thermal distribution exhibits a more controlled and directed heat release pattern. By redirecting combustion gases away from the exhaust valves 64 and 66 and exhaust bridge 62, this piston configuration creates a thermally managed zone.

Figure 8:
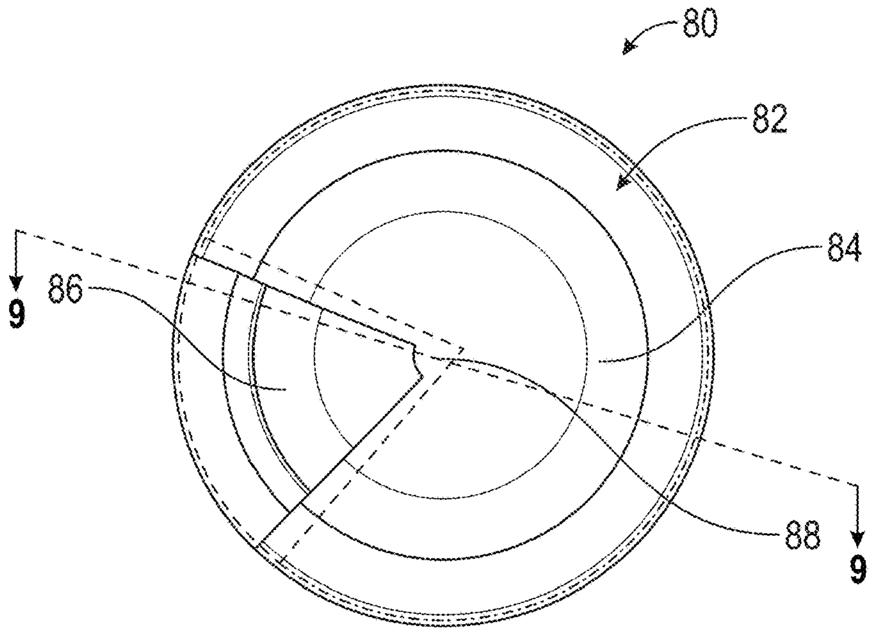
FIG. 8 is a top view of an example alternative piston having a piston bowl with multiple asymmetric sectors.
Figure 9:
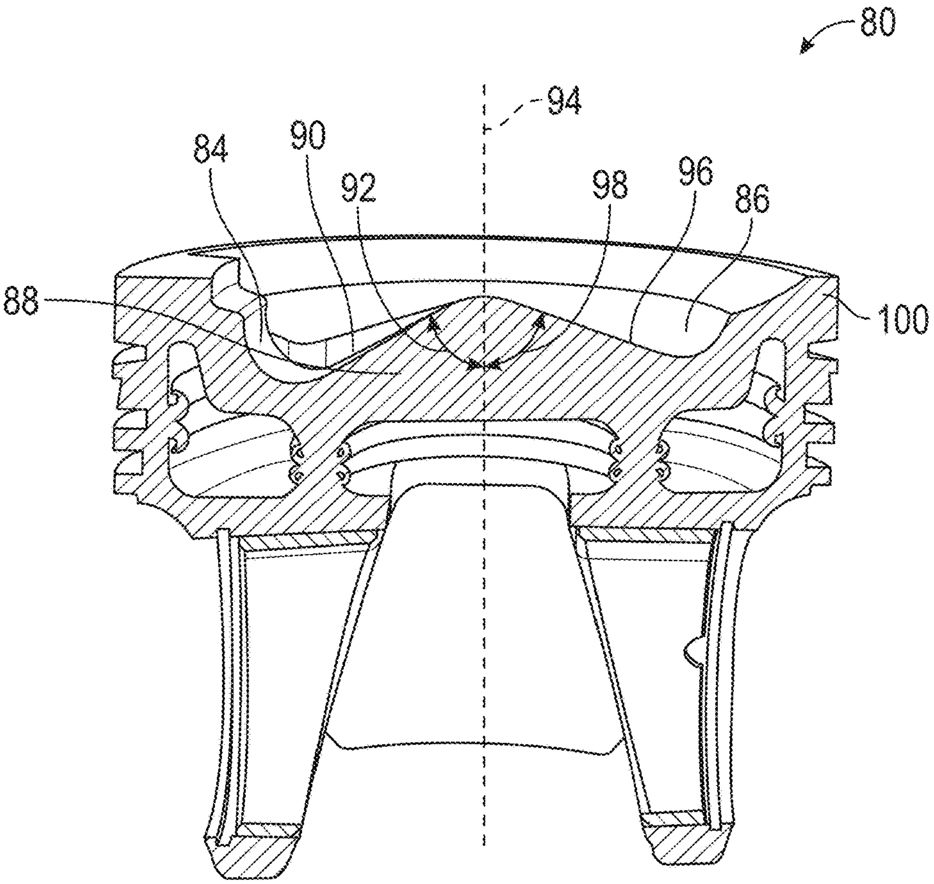
FIG. 9 is side sectional view of the area 9-9, in FIG. 8 of the piston.

FIGS. 8 and 9 illustrate another example piston 80. FIG. 8 provides a top-down view of piston 80, showing the arrangement of the annular piston bowl 82. The annular piston bowl 82 consists of two distinct sections: the primary bowl 84 and the asymmetric bowl sector 86. The primary bowl 84 covers a larger, symmetric portion of the piston, while the asymmetric bowl sector 86 occupies a smaller, asymmetrically shaped section to optimize combustion control in specific areas.

At the center of piston 80 is the conical center 88, from which the lower sidewalls of both bowl sections extend outward. A lower sidewall 90 of the primary bowl 84 extends outward at a first angle 92 relative to the centerline 94 of the piston. The lower sidewall 96 of the asymmetric bowl sector 86 extends outward at a second angle 98, different from the first angle 92. This difference in angles is designed to direct fuel combustion uniquely in each region, enhancing combustion efficiency while minimizing thermal stress in sensitive engine areas such as the exhaust bridge.

FIG. 9 provides a cross-sectional side view of piston 80 about section 9-9 of FIG. 8, revealing the internal structure of the piston head 100 and the annular piston bowl 82. The conical center 88 of the piston head 100 is defined by the primary bowl 84 and asymmetric bowl sector 86 extending outward from the centerline 94. The lower sidewall 90 of the primary bowl 84 extends at the first angle 92 relative to the centerline 94, while the lower sidewall 96 of the asymmetric bowl sector 86 extends at the second angle 98 relative to the centerline 94.

These angles can be adjusted to achieve different combustion dynamics in each sector of the piston. The lower sidewall 96 of the asymmetric bowl sector 86, angled at the second angle 98, creates a smaller combustion volume compared to the primary bowl 84. This reduced volume in the asymmetric bowl sector is specifically designed to direct combustion away from sensitive areas, thereby lowering the temperature in surrounding engine components, such as the exhaust bridge, and reducing thermal stress on these critical regions.

This cross-sectional view highlights the contrast in depth and geometry between the two bowl sections. The primary bowl 84 is structured to promote uniform combustion, while the asymmetric bowl sector 86 enables more targeted control over the combustion process. This configuration helps manage heat more effectively in critical regions of the piston, such as the exhaust bridge, by directing combustion gases in a way that reduces excessive heat concentration in those areas.

FIG. 10 illustrates multiple asymmetric bowl sectors, each having distinct shapes and functions, however, some sectors may have similar shapes to one another while being different in shape from the primary bowl sector. Beginning with a conical center and lower sidewalls that extend outward to form the asymmetric bowl sectors. In one embodiment, asymmetric bowl sector 102 could have a relatively shallow slope compared to the other sectors, directing combustion gases away from certain areas while maintaining a gradual flow. The shallower profile allows for controlled heat dissipation and is positioned away from vulnerable regions, such as the exhaust bridge. In contrast, an asymmetric bowl sector 104 may have a deeper, more recessed structure designed to capture and control combustion gases more aggressively. The steeper sidewall of asymmetric bowl sector 104 suggests a focus on redirecting combustion gases away from important areas, concentrating the heat in a more confined region. Asymmetric bowl sector 106 presents an intermediate depth, balancing the functions of the first two sectors. This asymmetric bowl sector 106 moderates combustion gas flow while providing adequate heat management without concentrating the gases in one specific region. These sectors collectively contribute to managing the thermal load of the piston by redistributing heat and preventing concentration on vulnerable engine parts, such as the exhaust bridge. The remaining sectors surrounding the asymmetric bowl sectors are referred to as a primary bowl. These areas or sectors that comprise the primary bowl have a shape and size that are uniform with one another, whereas each of the asymmetric bowl sectors may have a distinct shape and size, though a subset of the asymmetric bowl sectors may have similar cross-sectional profile to one another. In this example, symmetric sectors 108, 110, and 112 would comprise the primary bowl.

CONCLUSION

The present disclosure provides piston designs and engine configurations aimed at managing high thermal loads within internal combustion engines, particularly in areas such as the exhaust bridge. By utilizing a combination of a primary bowl and an asymmetric bowl sector, the distribution of combustion gases can be controlled to promote more uniform heat dissipation while helping to reduce localized temperatures in critical regions of the cylinder head. The asymmetric bowl sector's geometry, combined with fuel injection at specific angles, directs combustion away from sensitive 17 areas like the exhaust bridge, which can help mitigate overheating and reduce thermal stress. This approach may enhance engine durability by addressing thermal stress-related concerns. Furthermore, the design can improve combustion efficiency while maintaining engine performance, reducing the need for more expensive materials or additional cooling systems. Overall, this piston design supports more effective thermal management in the combustion chamber and may contribute to improved engine reliability and longevity in high-performance applications.

As utilized herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C). Also, the use of "one or more of" or "at least one of" in the claims for certain elements does not imply other elements are singular nor has any other effect on the other claim elements.

As utilized herein, the singular forms "a", "an," and "the" are intentionally-grown to include the plural forms as well, unless the context clearly indicates otherwise. It will be further understood that the terms "comprises" and/or "comprising," when utilized in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intentionally-grown to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A piston for an engine having a cylinder head with a cylinder defining a combustion chamber and supporting a fuel injector configured to deliver a spray of fuel to the combustion chamber, the piston configured to reciprocate within the cylinder and compress a mixture of air and the fuel within the combustion chamber, the piston comprising:

a piston head having a profiled upper surface that extends radially about a centerline and defines an annular piston bowl, the annular piston bowl having a primary bowl with a first bowl configuration and an asymmetric bowl sector with a second bowl configuration different from the first bowl configuration, the primary bowl extends about the centerline proximate a periphery of the piston head to each side of the asymmetric bowl sector and the asymmetric bowl sector extends farther from the centerline and a top plane of the piston head than the primary bowl, the primary bowl defined by a sweep of a radial line from the centerline of the piston head through a first angle and the asymmetric bowl sector defined by a sweep of the radial line from the centerline of the piston head through a second angle less than the first angle, the second angle sized so that the spray of fuel from the fuel injector is received within the asymmetric bowl sector and not the primary bowl.

2. The piston of claim 1, wherein the asymmetric bowl sector is located beneath a section of the cylinder head defining an exhaust bridge extending between a first exhaust valve port and a second exhaust valve port.

3. The piston of claim 2, wherein the asymmetric bowl sector effects a combustion of the spray of fuel such that a temperature at the exhaust bridge is a reduced temperature that is less than a first temperature corresponding to a combustion of the spray of fuel effected by the asymmetric bowl sector if configured with the first bowl configuration.

4. The piston of claim 1, wherein the first angle of the primary bowl is greater than 180 degrees.

5. The piston of claim 4, wherein the second angle of the asymmetric bowl sector is less than 90 degrees.

6. The piston of claim 1, wherein the first bowl configuration is of a first uniform cross-section throughout the first angle; and wherein the second bowl configuration is of a second uniform cross-section throughout the second angle different from the first uniform cross-section.

7. A piston for an engine having a cylinder head with a cylinder defining a combustion chamber and supporting a fuel injector configured to deliver a spray of fuel to the combustion chamber, the piston configured to reciprocate within the cylinder and compress a mixture of air and the fuel within the combustion chamber, the piston comprising:

a piston head having a profiled upper surface that extends radially about a centerline and defines an annular piston bowl, the annular piston bowl having a primary bowl with a first bowl configuration and an asymmetric bowl sector with a second bowl configuration different from the first bowl configuration, the primary bowl extends about the centerline proximate a periphery of the piston head to each side of the asymmetric bowl sector, the primary bowl defined by a sweep of a radial line from the centerline of the piston head through a first angle and the asymmetric bowl sector defined by a sweep of the radial line from the centerline of the piston head through a second angle less than the first angle, the second angle sized so that the spray of fuel from the fuel injector is received within the asymmetric bowl sector and not the primary bowl;

wherein an upper surface of the piston head defines an annular shelf extending about the centerline between the primary bowl and the periphery of the piston head, the annular shelf including a primary shelf extending along the primary bowl and having a first shelf configuration and an asymmetric shelf sector extending along the asymmetric bowl sector having a second shelf configuration different from the first shelf configuration.

8. The piston of claim 6, wherein the first shelf configuration of the primary shelf extends farther below a top plane of the piston head than the second shelf configuration of the asymmetric shelf sector.

9. The piston of claim 8, wherein the second bowl configuration of the asymmetric bowl sector has a greater concavity and extends farther from the centerline beneath the annular shelf than the first bowl configuration of the primary bowl; and wherein a combustion of the spray of fuel is contained within the asymmetric bowl sector below the annular shelf.

10. A piston for an engine having a cylinder head with a cylinder defining a combustion chamber and supporting a fuel injector configured to deliver a spray of fuel to the combustion chamber, the piston configured to reciprocate within the cylinder and compress a mixture of air and the fuel within the combustion chamber, the piston comprising:

a piston head having a profiled upper surface that extends radially about a centerline and defines an annular piston bowl, the annular piston bowl having a primary bowl with a first bowl configuration and an asymmetric bowl sector with a second bowl configuration different from the first bowl configuration, the primary bowl extends about the centerline proximate a periphery of the piston head to each side of the asymmetric bowl sector, the primary bowl defined by a sweep of a radial line from the centerline of the piston head through a first angle and the asymmetric bowl sector defined by a sweep of the radial line from the centerline of the piston head through a second angle less than the first angle, the second angle sized so that the spray of fuel from the fuel injector is received within the asymmetric bowl sector and not the primary bowl;

wherein the second bowl configuration of the asymmetric bowl sector has a greater concavity and extends farther from the centerline and a top plane of the piston head than the first bowl configuration of the primary bowl.

11. An engine having a cylinder head with a cylinder defining a combustion chamber and supporting a fuel injector configured to deliver of a spray of fuel to the combustion chamber, the engine having a piston disposed to reciprocate within the cylinder and compress a mixture of air and the fuel within the combustion chamber, the piston having a piston head with a profiled upper surface that extends radially about a centerline and defines an annular piston bowl, the annular piston bowl having a primary bowl with a first bowl configuration and an asymmetric bowl sector with a second bowl configuration different from the first bowl configuration, the primary bowl extends about the centerline proximate a periphery of the piston head to each side of the asymmetric bowl sector, the primary bowl defined by a sweep of a radial line from the centerline of the piston head through a first angle and the asymmetric bowl sector defined by a sweep of the radial line from the centerline of the piston head through a second angle less than the first angle, the second angle sized so that the spray of fuel from an injector is received within the asymmetric bowl sector and not the primary bowl.

12. The engine of claim 11, wherein the asymmetric bowl sector of the piston head is located beneath a section of the cylinder head defining an exhaust bridge extending between a first exhaust valve port and a second exhaust valve port.

13. The engine of claim 12, wherein the asymmetric bowl sector of the piston head effects a combustion of the spray of fuel such that a temperature at the exhaust bridge is a reduced temperature that is less than a first temperature corresponding to a combustion of the spray of fuel effected by the asymmetric bowl sector if configured with the first bowl configuration.

14. The engine of claim 11, wherein the first angle of the primary bowl is greater than 180 degrees.

15. The engine of claim 14, wherein the second angle of the asymmetric bowl sector is less than 90 degrees.

16. The engine of claim 11, wherein an upper surface of the piston head defines an annular shelf extending about the centerline between the primary bowl and the periphery of the piston head, the annular shelf including a primary shelf extending along the primary bowl and having a first shelf configuration and an asymmetric shelf sector extending along the asymmetric bowl sector having a second shelf configuration different from the first shelf configuration.

17. The engine of claim 16, wherein the first shelf configuration of the primary shelf extends farther below a top plane of the piston head than the second shelf configuration of the asymmetric shelf sector.

18. The engine of claim 17, wherein the second bowl configuration of the asymmetric bowl sector has a greater concavity and extends farther from the centerline beneath the annular shelf than the first bowl configuration of the primary bowl; and wherein a combustion of the spray of fuel is contained within the asymmetric bowl sector below the asymmetric shelf.

19. The engine of claim 11, wherein the second bowl configuration of the asymmetric bowl sector has a greater concavity and extends farther from the centerline and a top plane of the piston head than the first bowl configuration of the primary bowl.

20. The engine of claim 11, wherein the first bowl configuration is of a first uniform cross-section throughout the first angle; and wherein the second bowl configuration is of a second uniform cross-section throughout the second angle different from the first uniform cross-section.

* * * * *